Patented May 15, 1951

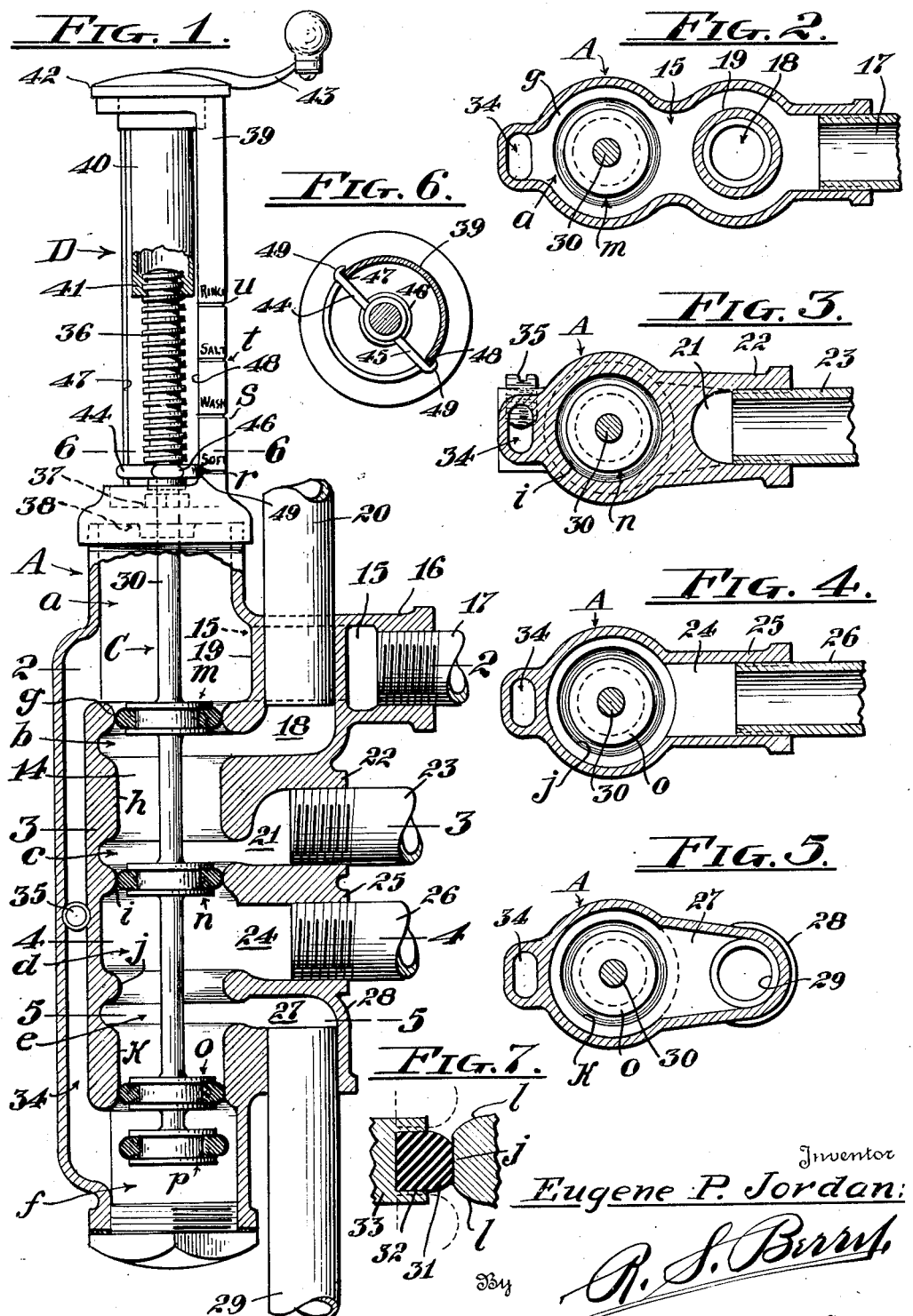

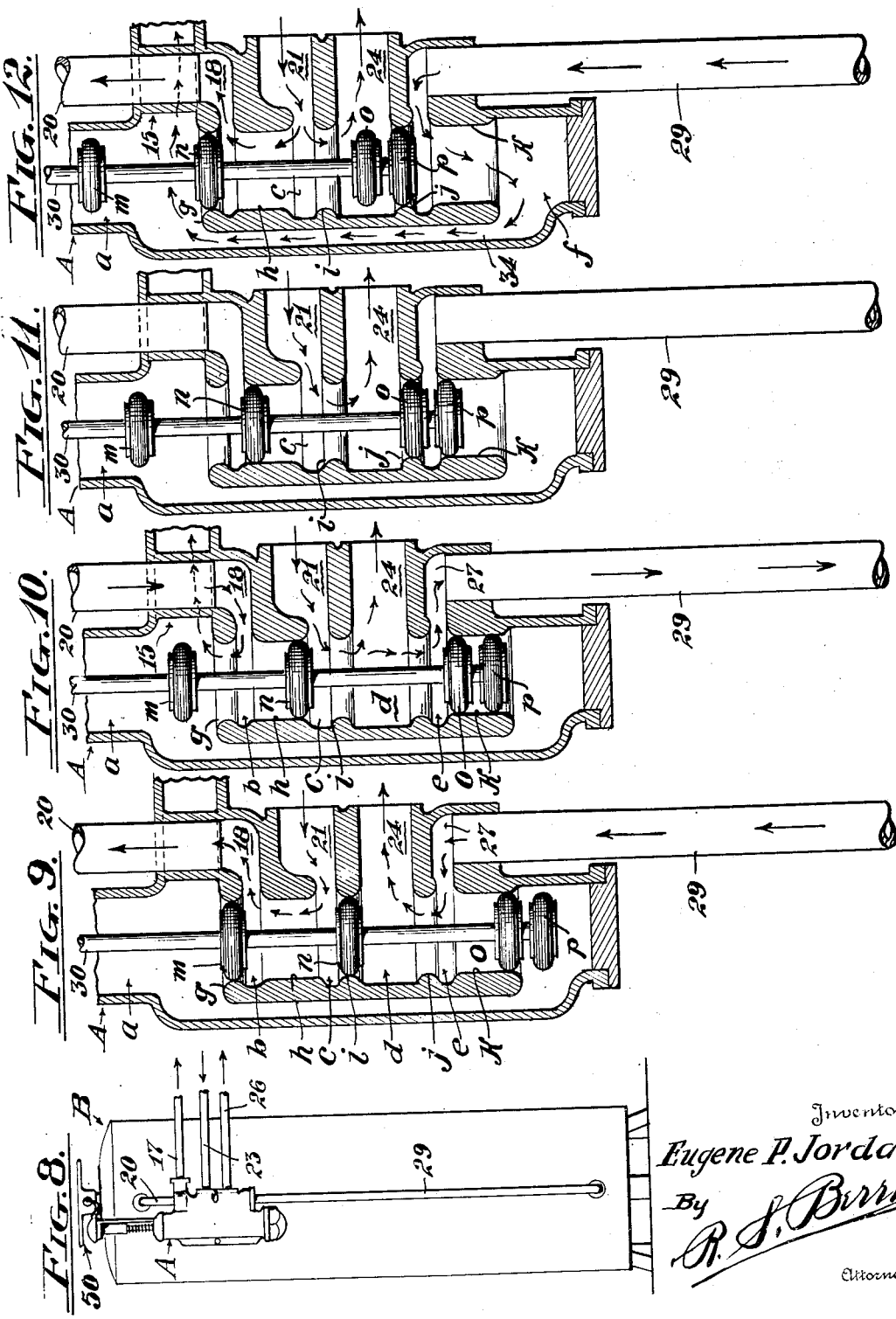

2,553,458

UNITED STATES PATENT OFFICE 2,553,458

VALVE

Eugene P. Jordan, Los Angeles, Calif.

Application November 14, 1945, Serial No. 628,431

11 Claims. (Cl. 251—76)

This invention relates to a valve and more particularly pertains to a valve of the type which embodies a piston valve including a plurality of valve elements carried on a single stem and mounted for reciprocal movement in a ported valve housing and operable by various positions of the stem and valve element assembly to control the directional flow of fluid through the valve.

An object of the invention is to provide a valve of the above character which is particularly applicable for use in water softening apparatus connected in a water supply line, in which the flow of water through the softening apparatus during the water softening action is in one direction, and during a regenerating operation the water is first flowed through the apparatus in a reverse direction to effect a flushing action and then prevented from going through the water softener to permit regenerating of the water softening element, and finally the flow of water is directed through the apparatus and to waste in flushing out the regenerating substance.

The primary object of the invention is to provide a valve for the purpose above specified, or any other purpose where similar operation are required, in which positioning of the valve elements in their various operative positions may be readily effected in consecutive order from a single operating element.

Another object is to provide a water softener valve which is capable of being progressively disposed in four positions, namely from a first or water softening position to a second or back washing position, then to a third or combined cut out and open to waste position and finally to a fourth or flushing position, and then be returned progressively from the fourth position back to the first position.

Another object is to provide an arrangement in the valve whereby it will momentarily open to waste when moving into a position in which water starts to flow into the softener tank either from above or below the water treating element therein so as to prevent impact of hydrostatic pressure on the body of material constituting the water softening element.

Another object is to provide a construction and assemblage whereby the valve housing with its various ports and passages and associated valve seat may be readily formed in a unitary structure so as to facilitate and economize construction of the valve.

Another object of the invention is to provide an arrangement of inlet and outlet passages in the valve housing which will permit ready connection of conduits therewith and whereby application of the valve in the system controlled thereby may be easily effected.

Another object is to provide an arrangement in the passages through the valve housing whereby a communication will be maintained through the housing between a source of liquid supply and a service line irrespective of positioning of the valve piston.

Another object is to provide the valve housing with a by-pass passage together with an adjustable means for regulating the flow of fluid through the passage.

Another object is to provide a construction in a valve piston whereby a minimum of resistance to movement of the latter by reason of frictional contact between the valve piston and its housing will be minimized.

Another object is to provide a construction in a valve element and its associated seat whereby the element may be passed through the passage bounded by the seat and operated to effect opening and closing of the passage from either end thereof.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view in vertical section, partly in elevation, of the valve structure;

Fig. 2 is a horizontal section taken on the line 2—2 of Fig. 1;

Fig. 3 is a horizontal section taken on the line 3—3 of Fig. 1;

Fig. 4 is a horizontal section taken on the line 4—4 of Fig. 1;

Fig. 5 is a horizontal section taken on the line 5—5 of Fig. 1;

Fig. 6 is a horizontal section taken on the line 6—6 of Fig. 1;

Fig. 7 is a detail in cross section of a valve element showing it in a seated position;

Fig. 8 is a view in elevation illustrating the valve as applied to the tank of a water softening apparatus; and Figs. 9, 10, 11 and 12 are diagrams depicting the mode of operation of the valve; and showing it in its several consecutive operative positions.

Referring to the drawings more specifically, A indicates generally the valve housing which is tubular and embodies an elongated bore 14 formed with a series of alternating differential diameters here shown as comprising enlarged chambers $a$, $b$, $c$, $d$, $e$, and $f$ with reduced portions $g$, $h$, $i$, $j$ and $k$ constituting valve seats arranged respectively between the chambers $a$ and $b$, $b$ and $c$, $c$ and $d$, $d$ and $e$, and $e$ and $f$. The bore 14 thus comprises end chambers $a$ and $f$ with a series of intermediate chambers $b$, $c$, $d$ and $e$ with a valve seat between adjacent chambers. The wall surfaces forming the juncture between the several chambers and the valve seats are rounded as indicated at $l$ and as particularly shown in Fig. 7 thus forming each of the valve seats with an outwardly rounded margin on each side thereof.

While the valve housing may be disposed in any suitable position when installed, for the convenience of description it will be referred to as disposed in the vertical upright position depicted in the drawings, that is, with the portion of the housing encompassing the chamber $a$ uppermost. The valve housing is formed with passages leading to the exterior thereof from the intermediate chambers $b$, $c$, $d$ and $e$ and from the upper end chamber $a$, and the end chambers are in open communication with each other through a by-pass passage, which passages may be disposed and may lead in any suitable direction as occasion may require, but a particular arrangement of which will be set forth herein.

Extending laterally from the chamber $a$ above the valve seat $g$ is a discharge to waste passage 15 leading through a boss 16 with which a drain pipe 17 is connectable as by a screw engagement. Chamber $b$ opens laterally to a passage 18 here shown as leading upwardly and encompassed by a wall 19 leading through the passage 15 with the passage 18 opening through the upper face of the boss 16 and adapted to receive a pipe 20 leading to the upper end portion of the tank B of a water softening apparatus, or other suitable structure. The passage 15 extends around the wall 19 as partciularly shown in Fig. 2.

The chamber $c$ opens laterally to a passage 21 opening through a boss 22 to which is connected as by screw connection a water feed pipe 23 leading from any suitable source of water supply, such as a city main. The chamber $d$ connects between the valve seats $i$ and $j$ with a passage 24 opening through a boss 25 to which a service pipe 26 may be connected as by a threaded joint and led to any point of discharge. The chamber $e$ connects between the valve seats $j$ and $k$ with a passage 27 which opens downwardly through a boss 28 with which is connected a pipe 29 leading to the lower portion of the tank B.

While the passages 15, 18, 21, 24 and 27 may lead from the chambers $a$, $b$, $c$, $d$ and $e$ at any point they are preferably arranged to lead from one side of the valve housing as shown in Fig. 1, since such arrangement enables direct connection with the ends of pipes 17, 23 and 26 arranged in parallel relation to each other as shown in Fig. 8, and also permits positioning of the valves between the pipes 20 and 29 arranged in longitudinal alignment with each other, thus facilitating installation of the valve. By the arrangement of the passages set forth the end portions of the conduits connecting with the valve housing lie on the same plane.

Arranged in the valve housing A is a valve piston C embodying a reciprocal stem 30 on which is mounted a plurality of valve elements $m$, $n$, $o$ and $p$ arranged to be collectively moved in and out of cooperative relation with the several valve seats, $g$, $h$, $i$, $j$ and $k$. Each of the valve elements comprises an elastic ring 31 formed of rubber or similar material, which ring is snugly seated in a channel 32 extending circumferentially of a spool 33 formed on or carried by the stem 30; the outer portion of the ring being semicircular in cross section with its periphery adapted to tightly engage the inner perimeter of the valve seat with which it is associated, so that the valve element will effectively cut off communication between chambers contiguous the valve seat. By rounding the outer peripherial portions of the sealing rings transversely and rounding the side margins of the valve seats the rings move onto the seats with ease and without mutilation of the rings, and passage of the valves through the seats from one side thereof to the other where required is facilitated.

The valve elements project from the stem 30 to afford spaces between the elements and are so arranged on the stem that when the piston is disposed in its lowermost position, as illustrated in Figs. 1 and 9 and which position constitutes the water softening position, the valve elements $m$, $n$ and $o$ will engage the valve seats $g$, $i$ and $k$ while the lower valve element $p$ will be disposed in the lower chamber $f$ below and clear of the valve seat $k$; the valve seats being spaced relative to each other and arranged relative to the spaced valve elements as to attain the recited relation. The valve seat $j$ is formed of such width between its opposed ends that the valve element $o$ may pass therethrough and be moved to its seated position from either end thereof. The seats $g$, $i$ and $j$ may be of any desired width, but the seats $h$ and $k$ are elongated so as to co-operate with the valve elements $n$ and $o$—$p$ respectively as guideways for the valve piston C.

The relative arrangement of the several valve elements and valve seats is such as to afford the following relations:

On moving the valve assembly upward from the water softening position above recited to the next successive backwashing position shown in Fig. 10, the valve $m$ will be advanced into the chamber $a$ clear of the valve seat $g$, valve $n$ will leave the valve seat $i$ and engage the valve seat $h$ and valve elements $o$ and $p$ will each engage the valve seat $k$.

On moving the valve assembly to its next successive combined cut out and open to waste position shown in Fig. 11 the valve $m$ will move further into the chamber $a$, valve $n$ will remain in engagement with the valve seat $h$, while the valve $o$ will engage the valve seat $j$ with the valve $p$ remaining in contact with valve seat $k$.

On moving the valve assembly to its next flushing position shown in Fig. 12 the valve $m$ will advance further into chamber $a$, valve member $n$ will engage the valve seat $g$, valve $o$ will advance into chamber $d$ and the lower valve $p$ will engage the valve seat $j$.

As a means for by-passing liquids around the valve seat assembly when the valve assembly is in its uppermost flushing position shown in Fig. 12 the valve housing is formed with a longitudinally extending passage 34 connecting the end chambers $a$ and $f$ above and below the valve seats $g$ and $k$ respectively. It is desirable that the passage 34 be restricted relative to the intake 21, so as to reduce the volume of flow through such passage 34 relative to the flow from the intake 21—23 to the waste pipe 17 as will be later described.

To this end the passage 34 may be reduced in cross sectional area relative to the cross sectional areas of the several passages and conduits, but it is also preferably equipped with an adjustment which is here shown as comprising a threaded plug 35 mounted in the wall of the passage 34 and adapted to be positioned to protrude into the passage as shown in Fig. 3 to restrict this passage according to requirements.

Any suitable means may be provided for effecting reciprocation of the piston valve C as occasion may require. As here shown an actuator is provided embodying a screw 36 extending in axial alignment with the upper end of the rod 30 and secured to the latter; the rod 30 slidably extending through a conventional packing gland 37 in an end wall 38 closing the upper end of the valve housing A.

The screw 36 extends from adjacent the wall 38 within a shell 39 carried by the latter and has threaded engagement with a rotary sleeve 40 extending in axial alignment therewith, the lower end of the sleeve being internally threaded as indicated at 41 to engage the screw 36. The upper end of the sleeve 40 is secured to a cap 42 journalled in the outer upper end of the sleeve 39 which cap is fitted with a handle 43 by which it may be manually rotated to effect turning of the sleeve 40 so as to cause the screw 36 to feed lengthwise in or out of the sleeve and thereby impart longitudinal movement through the screw 36 and the attached valve stem 30 with its associated valve elements; the screw 36 being held against rotation by means of fingers 44 and 45 protruding from opposite sides of a collar 46 affixed to the stem 30 adjacent the lower end of the screw 36 which fingers 44 and 45 slidably abut opposed parallel margins 47 and 48 formed on the shell 39 and extending longitudinally thereof in parallel relation to the axis of the screw 36. The outer end of either one or both of the fingers 44 and 45 is formed with a pointer 49 which overlies the outer face of the shell 39 for cooperation with a series of vertically spaced designated marks $r$, $s$, $t$ and $u$ to form an indicator whereby the position of the valve elements relative to the several valve seats may be determined.

As indicated in Fig. 1, the lower line $r$ bears indicia "Soft" and is so related to the arrangement of the valve elements that when the pointer 49 indicates the line $r$ the valve elements will be in their lowermost position as shown in Figs. 1 and 9 in which position water is directed downwardly to the tank B in the treating or water softening operation. The line $s$ is designated by the indicia "Wash" and is so positioned relative to the valve elements and their associated valve seats that when the valve elements are moved upwardly such distance that the pointer 49 will indicate the line $s$ the parts will be disposed as shown in Fig. 10 so as to reverse the direction of flow of water through the tank B and to waste in effecting a back-wash flushing action on the water treating elements. The line $t$ is designated by the indicia "Salt" and is so positioned relative to the valve elements and their associated valve seats that when the valve elements are elevated to a position where the pointer 49 indicates the line $t$ the parts will be disposed as shown in Fig. 11 and such as to prevent the flow of water through the tank so that the water confined in the latter will be static and thus permit the application to the tank of a regenerating substance such as salt employed in reconditioning the treating elements in the tank B. The uppermost line $u$ is designated by the indicia "Rinse" and is so related to the valve elements that when the latter are in their uppermost position as shown in Fig. 12 the arrow 49 will indicate the line $u$. When the valve elements are in this position the flow of water will be directed downwardly through the reservoir and then to waste through the restricted passage 34, chamber $a$, passage 15, and pipe 17 and then effect a flushing action.

In the operation of the valve structure the valve elements on being disposed in their lowermost position as shown in Figs. 1 and 9 water will flow from the main supply pipe 23 into the chamber 21 extending between the valve seats $h$ and $i$ and will then flow through the passage formed by the valve seat $h$ through the chamber $b$ and passage 18 and pipe 20 to the upper end of the tank B and downwardly through the water treating elements in the latter and through the discharge pipe 29 into the passage 27 into the chamber $e$ in the valve housing, then through the space bounded by the valve seat $j$ in the chamber $e$ and passage 24 from which water is directed to suitable points of discharge through the service pipe 26. The water in thus passing downward through the treating elements in the tank will be subjected to a softening action while the softening element is active, and accordingly the valve is referred to as being disposed in the water softening position when the valve elements are in the recited extreme lowermost position.

When it is desired to flush the tank B which is effected by a backwashing action the valve elements are moved upwardly by rotating the sleeve 40 as by use of the handle 43 so as to cause the screw 36 to move upwardly in its threaded connection with the sleeve, which movement is continued until the pointer 49 designates the line $s$ whereupon on arresting movement of the valve elements they will be disposed as shown in Fig. 10 with the valve element $n$ positioned above the inlet passage 21 of the water supply pipe 23 and in engagement with the valve seat $h$ and with the upper valve element $m$ disposed above and spaced from the valve seat $g$ to open communication between the chamber $a$ through the passage bounded by the valve $g$ to the passage 15 leading to the overflow pipe 17. The valve elements $o$ and $p$ will then be disposed in engagement with the elongated valve seat $k$ immediately below the chamber $e$ and passage 27 opening to the pipe 29. When the parts are thus disposed in the back washing or second position water will flow in the direction indicated by the arrows in Fig. 10, namely, from the intake pipe 23, passage 21, chamber $c$, downwardly through the passage bounded by the valve seat $i$ into chamber $e$, passage 27 and pipe 29 to the lower end of the tank B, then upwardly through the tank and the treating element therein and out through the pipe 20 into the passage 18, chamber $b$ and through the passage bounded by the valve seat $g$ and to discharge to waste through passage 15 and pipe 17.

When it is desired to prevent the flow of water to and from the tank B the valve elements are disposed in the cut-out position shown in Fig. 11 by operating the actuator handle 43 until the pointer 49 indicates the line $t$. The valve elements $n$ and $o$ will then be disposed in sealing engagement with the valve seats $h$ and $j$ thereby cutting off communication through the tank B while maintaining communication between the water feed pipe 23 and the water supply pipe 26 through the passage 21, chamber $c$, passage bounded by the valve seat $i$, chamber $d$ and passage 24, as indicated by the arrows in Fig. 11. In accordance with the usual practice in effecting regeneration of the water treating element in the tank B a quantity of salt is delivered to the interior of the tank as through an opening in the top thereof normally closed by a removable cap 50.

It is necessary to flush the resultant brine from the tank which is effected in the present instance by operating the actuator handle 43 to move the screw 36 to dispose the pointer 49 in register with the line $u$ where the valve elements will be disposed in their uppermost or flushing position as shown in Fig. 12. The valve element $n$ will then be positioned in engagement with the valve seat $g$ and the valve element $p$ will be in engagement with the valve seat $j$ while the valve element $o$ will be disposed in the chamber $d$ thus opening communication between the water feed and the upper end of the tank and opening communication between the lower end of the tank through the pipe 29 to the chamber $f$ through the chamber $e$ and the passage bounded by the valve seat $k$ to direct water from the tank to discharge through the restricted passage 34, chamber $a$, passage 15 and pipe 17. This flow of the water to discharge will be retarded or restricted relative to the normal flow of water through the tank by reason of the restriction afforded by the reduced passage 34 so as to maintain the flushing water in contact with the filtering and treating elements in the tank B a sufficient length of time to effect a thorough washing action.

After the desired flushing action has been effected and it is desired to restore the apparatus to the water treating condition, the valve elements are returned to their normal lowermost position by reversing the direction of rotation of the handle 43 and the threaded sleeve 60 to move the screw 36 and its associated parts downwardly to the position where the pointer 49 will indicate the lower line $r$.

It will be seen from the foregoing that the valve is subject to being disposed in four objective positions namely, first a water softening position, second, a back washing position, third, a cut-out and open to waste position and fourth, a flushing position, and that it is operable progressively from the first to the fourth positions and back so that when applied to the water softener tank B the several steps required in regenerating the softener may be effected by progressive, consecutive or successive positionings of the valve thus obviating the need of shifting the valve back and forth to selected positions as commonly required in water softener valves heretofore produced involving at least four operating positions. The progressive positioning of the valve being effected by rectilineal movement through the medium of the actuator D admits of the pointer 49 of the valve position indicator being likewise moveable on a rectilineal path up and down to and from the various positions so that the operator may readily determine the position of the valve and with little or no possibility of error.

In order to prevent sudden impact of hydrostatic pressure on the filtering and water softening elements in the tank B when initially directing water into the latter through the valve, the valve elements $m$ and $n$ and the seats $g$ and $i$ are so arranged relative to the intake passage 21 and the discharge to waste passage 15 that when the valve elements $m$ and $n$ move upwardly from the seats $g$ and $i$ in advancing from the first position shown in Fig. 9 to the second position shown in Fig. 10 communication will be effected between the intake passage 21 and the discharge to waste passage 15 which communication will be maintained until the valve element $n$ abuts the seat $h$ or is restored to its closed position on the seat $i$. Furthermore when the valve element $n$ is in this intermediate position between the seats $i$ and $h$ communication will be effected between the intake passage 21 and the passage 18 connected to the upper end of the tank and also to the service passage 24 and to the passage 27 connecting with the lower end of the tank B through the pipe 29 which latter communication with the tank will be afforded by reason of valve element $o$ being in an intermediate position below the seat $j$. When the parts are thus disposed pressure will be equalized on opposed ends of the body of water treating material in the tank and hydrostatic pressure will be relieved from the tank by flow of water to exhaust through the waste passage 15 which condition will prevail until the valve is either restored to its first position shown in Fig. 9 or disposed in its second position shown in Fig. 10. It will now be seen that as the valve is operated to reverse the direction of flow of water through the tank hydrostatic pressure will be gradually built up in either end of the tank according to movement of the valve from the first to the second position or from the second to the first position. In like fashion when the valve is moved from its cut-out or third position to either the flushing or fourth position or back to the back wash or third position the intake passage 21, will be momentarily opened to exhaust or waste before being fully open to the tank, since on moving the valve element $n$ to an intermediate position between the seats $h$ and $g$ from the third to the fourth position or vise versa the inlet 21 will then be in communication with the drain or outlet passage 15 around the valve element $n$, and on moving the valve from the third position to an intermediate position between the third and the second positions hydrostatic pressure from the intake passage 21 will initially be relieved from the tank by reason of the valve element $o$ being disposed intermediate the seats $j$ and $k$ so that water will flow from the source around the valve $o$ through the pipe 29, tank B, and pipe 20 to exhaust through passage 18, and 15 through the then open valve seat $g$.

Gradual building up of the hydrostatic pressure in the tank in the manner above described is highly desirable since it avoids or at least minimizes channeling of the filtering and water softening elements in the tank as is apt to occur when high hydrostatic pressure is suddenly imposed thereon, and also prevents unwanted disturbance of the filtering and softening material.

An important feature of the invention resides in the arrangement of the valve elements and several valve seats whereby a flow of water may be maintained from the feed pipe 23 to the service line 26 irrespective of any position assumed by the valve elements in controlling the flow of water through the tank, thus obviating interruption of water service during the regeneration period.

While I have shown and described a specific embodiment of my invention I do not limit myself to the exact details of construction set forth, and the invention embraces such changes, modifications and equivalents of the parts and their formation and arrangement as come within the purview of the appended claims.

This application relates to the subject matter of my previous application Serial Number 589,919, filed April 23, 1945 and is a continuation thereof at least in part.

I claim:

1. In a valve for a water softener tank, a housing having a bore, a series of spaced axially aligned inwardly projecting annular valve seats in said bore, said bore embodying chambers between contiguous valve seats and at the end portions of said bore, a fluid passage leading to the exterior of the housing from each of the chambers located between the valve seats including a passage for communication with one end of a softener tank, a passage for communication with the other end of a softener tank, a water supply passage and a water service passage; said housing also having a waste passage leading from one of said end chambers and having a by-pass passage connecting said end chambers; a valve stem extending axially of the bore, means for reciprocating said stem, and a plurality of spaced elastic ring valves carried on said stem arranged for sealing engagement with certain of said valve seats and for positioning in certain of said chambers; said ring valves being proportioned relative to said chambers to afford a passage around a valve when positioned in a chamber; said assembly of ring valves including an end ring valve for positioning between the end chamber communicating directly with the waste passage and the adjacent chamber, another end valve for engagement with the valve seat between the other end chamber and its adjacent chamber, a ring valve for engagement with the valve seat between the chambers connecting with the water supply passage and the water service passage, and a ring valve for engagement with the valve seat between the end passage with which the by-pass passage connects and the contiguous chamber and also for engagement with the valve seat between said last named chamber and the chamber connecting with the water service passage.

2. In a valve for a water softener tank, a housing having a bore, a series of spaced circumferentially extending inwardly projecting valve seats in said bore, said bore embodying a chamber between each of the contiguous valve seats and an end chamber at each end of the series of valve seats, a fluid passage leading to the exterior of the housing from each of the chambers located between the valve seats including a passage for communication with the upper end of a softener tank, a passage for communication with the lower end of a softener tank and a pair of intermediate passages constituting a water supply passage and a water service passage; said housing also having a waste passage leading from one of said end chambers and having a by-pass passage connecting said end chambers; a longitudinally reciprocable valve stem extending axially of said bore, means for reciprocating said stem, and an assembly of a plurality of spaced valve elements carried on said stem arranged for sealing engagement with certain of said valve seats and for positioning in certain of said chambers; said valve elements being proportioned relative to said chambers to afford a passage around a valve element when positioned in a chamber; said valve assembly when in one of its extreme positions interconnecting the water supply passage to the passage for communication with the upper end of a tank and interconnecting the passage for communicating with the lower end of a tank with the water service passage, and being moveable to a second progressive position and there interconnecting the water supply passage, the passage for communicating with the lower end of a tank and at the same time interconnect the passage for communicating with the upper end of a tank and the waste passage, and being moveable to a third progressive position and there interconnecting the water supply passage and the service passage, and interconnecting the passage for communicating with the upper end of a tank and the waste passage, and being moveable to a fourth progressive position and there interconnecting the water supply passage, and the passage for communicating with the upper end of a tank and interconnecting the passage for communicating with the lower end of a tank, the by-pass passage and the waste passage.

3. In a valve for a water softener tank, a housing having a bore, a series of spaced circumferentially extending inwardly projecting valve seats in said bore, said bore embodying a chamber between each of the contiguous valve seats and an end chamber at each end of the series of valve seats, a fluid passage leading to the exterior of the housing from each of the chambers located between the valve seats including a passage for communication with the upper end of a softener tank, a passage for communication with the lower end of a softener tank and a pair of intermediate passages constituting a water supply passage and a water service passage; said housing also having a waste passage leading from one of said end chambers and having a by-pass passage connecting said end chambers; a longitudinally reciprocable valve stem extending axially of said bore, means for reciprocating said stem, and an assembly of a plurality of spaced valve elements carried on said stem arranged for sealing engagement with certain of said valve seats and for positioning in certain of said chambers; said valve elements being proportioned relative to said chambers to afford a passage around a valve element when positioned in a chamber; said valve assembly when in one of its extreme positions interconnecting the water supply passage to the passage for communication with the upper end of a tank and interconnecting the passage for communicating with the lower end of a tank with the water service passage, and being moveable to a second progressive position and there interconnecting the water supply passage, the service passage and the passage for communicating with the lower end of a tank and at the same time interconnect the passage for communicating with the upper end of a tank and the waste passage, and being moveable to a third progressive position and there interconnecting the water supply passage and the service passage, and interconnecting the passage for communicating with the upper end of a tank and the waste passage, and being moveable to a fourth progressive position and there interconnecting the water supply passage, the service passage and the passage for communicating with the upper end of a tank and interconnecting the passage for communicating with the lower end of a tank, the by-pass passage and the waste passage.

4. The structure called for in claim 2, together with means for adjustably restricting the by-pass passage.

5. The structure called for in claim 2, together with means for indicating exteriorly of the valve the several operative positions of the valve assembly.

6. The structure called for in claim 2, together with means for indicating exteriorly of the valve the several operative positions of the valve assembly embodying an indicating pointer connected relative to said valve stem, and indicia arranged to be designated by said pointer in the several positions of the valve assembly.

7. In a valve for a water softener tank, a housing having a bore, a series of spaced circumferentially extending inwardly projecting valve seats in said bore, said bore embodying a chamber between each of the contiguous valve seats and an end chamber at each end of the series of valve seats, a fluid passage leading to the exterior of the housing from each of the chambers located between the valve seats including a passage for communication with the upper end of a softener tank, a passage for communication with the lower end of a softener tank and a pair of intermediate passages constituting a water supply passage and a water service passage; said housing also having a waste passage leading from one of said end chambers and having a by-pass passage connecting said end chambers; a longitudinally reciprocable valve stem extending axially of said bore, means for reciprocating said stem, and an assembly of a plurality of spaced valve elements carried on said stem arranged for sealing engagement with certain of said valve seats and for positioning in certain of said chambers; said valve elements being proportioned relative to said chambers to afford a passage around a valve element when positioned in a chamber; said valve assembly when in one position establishing communication from the water supply passage and the passage for communication with the upper end of a tank and between the passage for communication with lower end of the tank and the water service passage, and in a second position establishing communication between the water supply passage, the water service passage and the passage for communication with the lower end of a tank and between the passage for communication with upper end of a tank and the waste passage; the said assembly when in a third position maintaining communication between the water supply passage and the water service passage and closing communication between said passages and the passages for communication with the ends of a tank; and said assembly when in a fourth position maintaining communication between the water supply passage and the water service passage and opening communication between the passage for communication with the lower end of a tank and the waste passage through the by-pass passage.

8. In a valve for a water softener tank, a housing having a bore, a series of spaced circumferentially extending inwardly projecting valve seats in said bore, said bore embodying chambers between contiguous valve seats and at the end portions thereof, a fluid passage leading to the exterior of the housing from each of the chambers located between the valve seats including a passage for communicating with the upper end of a softener tank, a passage for communicating with the lower end of a softener tank, and a pair of intermediate passages constituting a water supply passage and a water service passage; said housing also having a waste passage leading from one of said end chambers and having a by-pass passage connecting said end chambers; a longitudinally reciprocal valve stem extending axially of said bore, means for reciprocating said stem, and an assembly of a plurality of spaced valve elements carried on said stem arranged for sealing engagement with certain of said valve seats and for positioning in certain of said chambers; said valve elements being proportioned relative to said chambers to afford a passage around a valve element when positioned in a chamber; said valve assembly in one position establishing communication between the water supply passage and the passage communication with the upper end of the tank and also establishing communication between the water service passage and the passage for communication with the other end of the tank, and when in said position closing communication between the water supply passage and the water service passage and between the water supply passage and the waste passage and between the water service passage and the by-pass passage; said valve assembly in another position establishing communication between the water supply passage and the water service passage and between the water supply passage and the passage for communication with the lower end of the tank and establishing communication between the passage for communication with the upper end of the tank and the waste passage, and when in such position closing communication between the water supply passage and the passage for communication with the upper end of the tank and closing communication between the passage for communication with the other end of the tank and the by-pass passage; said valve assembly when in a third position maintaining communications between the water supply passage and the water service passage and closing communication between the water supply passage and the water service passage with the passages for communication with the ends of the tank; and said valve assembly when in a fourth position maintaining communication between the water supply passage and the water service passage and establishing communication between the water service and the passage for communication with the upper end of the tank and establishing communication between the passage for communication with the lower end of the tank and the by-pass passage, and in said fourth position closing communication between the passage for communication with the upper end of the tank and the chamber communicating directly with the waste passage, and also closing communication between the water service passage and the passage for communication with the lower end of the tank and to the by-pass passage.

9. In a valve, a housing having a bore formed with a series of chambers including a pair of end drain chambers and intermediate chambers, an annular valve seat separating each of the adjacent chambers, said housing being formed with lateral passages leading from the intermediate chambers and having a lateral open drain passage leading from one of the end chambers, a pipe leading through said drain passage and connecting with the passage leading from the chamber adjacent the end drain chamber fitted with said drain passage, a by-pass passage in said housing connecting said end drain chambers, and a series of connected valve elements in said bore cooperable with said seats, and means for actuating said valve elements to open and close adjacent chambers relative to each other.

10. A water softening valve comprising a housing having a chamber at each end thereof and formed with a by-pass passage connecting said chambers, forming an open communication therebetween at all times, an open waste passage leading from one of said end chambers, a series of four chambers interposed between said end chambers including a pair of chambers comprising an inlet and an outlet chamber and chambers intermediate said pair of chambers and the end chambers, a passage leading from each of said intermediate chambers to the exterior of said housing, an inlet passage leading to said inlet chamber, an outlet passage leading from said outlet chamber, an annular valve seat between each of adjacent chambers, a reciprocal valve stem extending axially of said valve seats, and a valve assembly on said stem comprising a plurality of spaced elastic valves fixed on said stem and arranged for cooperation with said seats; said seats and valves being relatively arranged to dispose a valve on each end seat and on a seat between the intake and outlet chambers to close the end chambers to the chambers interposed therebetween and to close communication between the inlet and outlet chambers when the valve assembly is in a first or one of its extreme positions; and when said valve assembly is in a successive second position to dispose the valve previously on the seat between the end chamber from which leads the waste passage to open said chamber to its adjacent intermediate chamber, and then dispose the valve previously on the seat between the intake and outlet chambers on a seat between the intake chamber and the adjacent intermediate chamber, and also maintain a valve on the seat between the other intermediate chamber and the adjacent end chamber and providing open direct communication between the inlet and outlet chamber and between the outer chamber and the adjacent intermediate chamber; and when said valve assembly is in a third consecutive position to dispose a valve on a seat between the intake chamber and the adjacent intermediate chamber, and another valve on the seat between the outlet chamber and the adjacent intermediate chamber, and with another valve on the seat between said last named intermediate chamber and its adjacent end chamber, and then providing open communication with the inlet chamber and the outlet chamber, and open communication between the end chamber from which the waste passage leads with its adjacent intermediate chamber; and when said valve assembly is in a successive fourth position to dispose a valve on the seat between the end chamber from which the waste passage leads and the adjacent intermediate chamber, with another valve positioned on the seat between the outlet chamber and its adjacent chamber, and then providing open communication between said last named intermediate chamber and the adjacent end chamber through said end chamber and the by-pass passage to the waste passage through the other end chamber, and at the same time maintain open communication between the intake chamber and the outlet chamber, and provide open communication between the outlet chamber and the adjacent intermediate chamber.

11. The structure called for in claim 10 together with means for reciprocating said valve stem and means associated therewith for indicating the several recited positions of the valve assembly.

EUGENE P. JORDAN.

REFERENCES CITED

The following references are of record in the file of this patent:

UNITED STATES PATENTS

| Number | Name | Date |
| --- | --- | --- |
| 331,789 | Harvey | Dec. 8, 1885 |
| 789,026 | Huston | May 2, 1905 |
| 1,123,273 | Gregersen | Jan. 5, 1915 |
| 1,220,979 | Gregory | Mar. 27, 1917 |
| 1,391,676 | Finley | Sept. 27, 1921 |
| 1,540,962 | Stuart | June 9, 1925 |
| 1,620,717 | Brice et al. | Mar. 15, 1927 |
| 1,652,710 | Dotterweich | Dec. 13, 1927 |
| 1,659,023 | Friend et al. | Feb. 14, 1928 |
| 1,707,692 | Ter Beest | Apr. 2, 1929 |
| 1,751,061 | Ter Beest | Mar. 18, 1930 |
| 1,878,019 | Stickney | Sept. 20, 1932 |
| 1,954,405 | Dotterweich | Apr. 10, 1934 |
| 2,042,186 | Peterson | May 26, 1936 |
| 2,137,406 | Johnson | Nov. 22, 1938 |
| 2,414,451 | Christensen | Jan. 21, 1947 |